(12) United States Patent
Hiraki et al.

(10) Patent No.: US 10,971,049 B2
(45) Date of Patent: Apr. 6, 2021

(54) DISPLAY DEVICE, INTERFACE UNIT AND DISPLAY SYSTEM

(71) Applicant: LG Display Co., Ltd., Seoul (KR)

(72) Inventors: Katsuyoshi Hiraki, Tokyo (JP); Takayuki Suzuki, Tokyo (JP)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/709,801

(22) Filed: Dec. 10, 2019

(65) Prior Publication Data

US 2020/0202762 A1 Jun. 25, 2020

(30) Foreign Application Priority Data

Dec. 25, 2018 (JP) ................. 2018-240506

(51) Int. Cl.
| | |
|---|---|
| *G06F 3/038* | (2013.01) |
| *G09G 3/20* | (2006.01) |
| *G06F 3/14* | (2006.01) |
| *G09G 3/3275* | (2016.01) |
| *G09G 3/36* | (2006.01) |
| *G09G 3/3266* | (2016.01) |

(52) U.S. Cl.
CPC .......... *G09G 3/20* (2013.01); *G06F 3/14* (2013.01); *G09G 3/3266* (2013.01); *G09G 3/3275* (2013.01); *G09G 3/3674* (2013.01); *G09G 3/3685* (2013.01); *G09G 2300/0426* (2013.01); *G09G 2300/0439* (2013.01); *G09G 2310/08* (2013.01); *G09G 2370/00* (2013.01)

(58) Field of Classification Search
CPC ............ G09G 3/20; G09G 2310/08; G09G 2300/0439; G09G 2370/00; G09G 3/3275; G09G 3/3674; G09G 3/3685; G09G 2300/0426; G09G 3/3266; G09G 2340/0492; G06F 3/14; G06F 1/1654; G09F 9/00

See application file for complete search history.

(56) References Cited

U.S. PATENT DOCUMENTS 9,141,148 B2* 9/2015 Richter ............... G06F 3/03547

FOREIGN PATENT DOCUMENTS

JP 6-208449 A 7/1994

* cited by examiner

*Primary Examiner* — Adam R. Giesy
(74) *Attorney, Agent, or Firm* — Seed Intellectual Property Law Group LLP

(57) ABSTRACT

A display device includes: a connector unit including a plurality of receiving electrodes configured to receive an input signal from a plurality of transmission electrodes of an interface unit having a flat plate shape; a signal processor which determines an arrangement of an input data included in the input signal; and a display output portion which performs an image output processing according to the arrangement of the input data determined by the signal processor, wherein the plurality of receiving electrodes are disposed to face the plurality of transmission electrodes in each of a plurality of connection directions defined by in-plane rotation angles of the interface unit, in a predetermined region which the interface unit opposes, and wherein the signal processor determines the arrangement of the input data according to the connection direction of the interface unit.

18 Claims, 8 Drawing Sheets

(a)          (b)

(a)  (b)

(a)  (b)

DISPLAY DEVICE, INTERFACE UNIT AND DISPLAY SYSTEM

CROSS-REFERENCE TO RELATED APPLICATIONS

The present application claims the priority benefit of Japanese Patent Application No. 2018-240506, filed in Japan on Dec. 25, 2018, which is hereby incorporated by reference in its entirety for all purposes as if fully set forth herein.

BACKGROUND

Technical Field

The present disclosure relates to a display device, an interface unit, and a display system.

Description of the Related Art

Generally, a video terminal, such as an HDMI™ terminal or a display port terminal, of a display device are provided in a specific direction at an end of the display device, and an input signal cable is connected to the video terminal along the specific direction. In other words, the direction of connecting the input signal cable outside the display device to the video terminal is limited to one direction. Further, in a display device employing an input signal cable using a flexible printed circuit (FPC) board, a connection direction of the input signal cable is limited to one direction. Thus, there is a problem that installation of the input signal cable becomes cumbersome and complicated depending on the installation situation of the display device.

BRIEF SUMMARY

One potential approach for addressing the problem of cumbersome and complicated installation of an input signal cable involves a configuration that enables a cable to be connected in two directions to a connector that is a connection terminal of a display device. For example, a tablet display may have a rotation use switch which designates either normal use or rotation use of a screen display. A normal use mode corresponding to normal input and display and a rotation use mode in which input coordinates from the tablet are rotated by 180 degrees and are displayed are switched according to a state of the rotation use switch. Further, the cable connected to the tablet display may be connected rotatably by 180 degrees to the connector of the tablet display. The connector and the cable are connected via a hinge to realize a 180 degree rotatable connection. However, such a configuration relies on a hinge for the connection of the connector and the cable and increases a thickness of a display device, and thus does not respond to a technical trend of a display device which tends to become thinner. Therefore, there is a need for a configuration that optimizes a handling of an input signal cable while realizing a thin display device.

Accordingly, the present disclosure is directed to a display device that can properly handle an input signal cable while maintaining thin-profile characteristics. Further, the present disclosure is directed to an interface unit suitable for such the display device and a display system using such the display device.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present disclosure, as embodied and broadly described herein, a display device includes: a connector unit including a plurality of receiving electrodes configured to receive an input signal from a plurality of transmission electrodes of an interface unit having a flat plate shape; a signal processor which determines an arrangement of an input data included in the input signal; and a display output portion which performs an image output processing according to the arrangement of the input data determined by the signal processor, wherein the plurality of receiving electrodes are disposed to face the plurality of transmission electrodes in each of a plurality of connection directions defined by in-plane rotation angles of the interface unit, in a predetermined region which the interface unit opposes, and wherein the signal processor determines the arrangement of the input data according to the connection direction of the interface unit.

In another aspect, an interface unit connectable to the connector unit of the above display device includes: a substrate; an input signal cable fixed to the substrate; a plurality of transmission electrodes disposed at the substrate; and a control circuit which supplies an input signal received from the input signal cable to a corresponding transmission electrode among the plurality of transmission electrodes.

In another aspect, a display system includes: the above display device and the above interface unit.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Reference will now be made in detail to embodiments, examples of which are illustrated in the accompanying drawings. The same or like reference numbers may be used throughout the drawings to refer to the same or like parts.

First Embodiment

Figure 1:
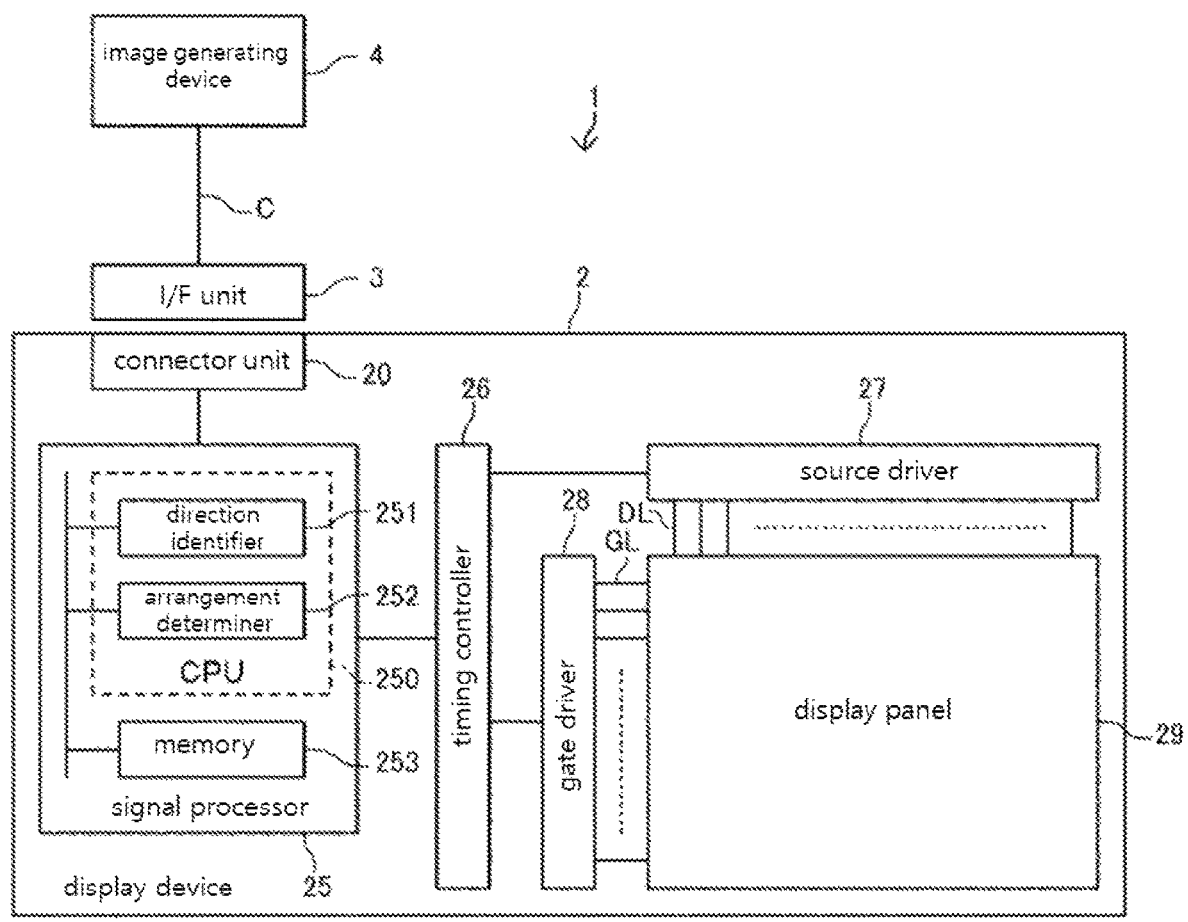
FIG. 1 is a block diagram illustrating a display system according to a first embodiment of the present disclosure.

FIG. 1 is a block diagram illustrating a display system according to a first embodiment of the present disclosure. The display system 1 may include a display device 2 and an interface (I/F) unit 3. The display device 2 may be a wall-mounted type display, a stationary type display, or the like. An image generating device 4 may be a server, a computer, a transmission facility, or the like, which is a transmitter of an input signal including an input video signal and the like. The interface assembly 3 (which may be referred to herein as interface unit 3) may be an interface to input the input signal, which are transmitted from the image generating device 4 through an input signal cable C (hereinafter referred to as a cable), and a detection signal (described later) to the display device 2.

The display device 2 may include a connector assembly 20 (which may be referred to herein as connector unit 20), a signal processor 25, a timing controller 26, a source driver 27, a gate driver 28, and a display panel 29. The timing controller 26, the source driver 27, the gate driver 28, and the display panel 29 may be collectively referred to as a display output portion. The display panel 29 may be an image display portion having organic light emitting diode (OLED) pixels arranged in a matrix form, or a liquid crystal display (LCD) having thin film transistor (TFT) pixels arranged in a matrix form.

The connector unit 20 may relay the input signal and the detection signal received from the interface unit 3 to the signal processor 25. The input signal includes an input video signal, a vertical synchronization signal, a horizontal synchronization signal, a clock signal, an input enable signal, and the like. The detection signal, as will be described in detail later, may be a signal (e.g., a two-bit signal, a four-level DC fixed signal, or the like) representing four values.

The signal processor 25 may include a CPU 250 and a memory 253, and the CPU 250 may include a direction identifier 251 and an arrangement determiner 252. The direction identifier 251 and the array determiner 252 may include respective electrical circuits, electrical components, or the like configured to perform the various operations described herein with respect to the direction identifier 251 and the array determiner 252. In some embodiments, one or both of the direction identifier 251 and the array determiner 252 may be embodied at least partially in software instructions configured to cause the CPU to perform the various operations described herein with respect to the direction identifier 251 and the array determiner 252. The signal processor 25 may determine an arrangement (map) of input data included in the input signal based on the input signal and the detection signal input from the interface unit 3. The CPU 250 may collectively control operations relating to the memory 253, the direction identifier 251, and the arrangement determiner 252. Further, the CPU 250 may properly perform processes (e.g., amplification of a received input signal, pulse shaping, signal format conversion of an input signal, etc.) as needed other than process of the signal processor 25 described below. The memory 253 may be a storage unit such as a ROM that stores a program, a map and the like, and a RAM that stores input data and the like. Further, all or part of the signal processor 25 may be included in the timing controller 26. In other words, the timing controller 26 may include all or part of the signal processor 25. In this case, the CPU, the memory, and the like may be shared by the signal processor 25 and the timing controller 26. The signal processor 25 may be mounted on a substrate 20a of the connector unit 20 in a form of an IC or the like. Accordingly, the present disclosure may be applicable by adding one substrate 20a to the existing display device 2.

The direction identifier 251 may identify a connection direction of the interface unit 3 for the connector unit 20 based on the detection signal. Further, the connection direction may be defined by an in-plane rotation angle of the interface unit 3 for the connector unit 20, as demonstrated from the following explanation. The arrangement determiner 252 may store the input data in the memory 253, and determine the arrangement of the input data stored in the memory 253 based on the connection direction identified by the direction identifier 251. Then, the arrangement determiner 252 may output the input data, on which the arrangement determination processing has been performed, to the timing controller 26. Further, the arrangement determination processing may include both a processing for holding an arrangement of the input data (hereinafter referred to as an arrangement holding processing) and a processing for changing an arrangement of the input data (hereinafter referred to as a rearrangement processing). The structure of the connector unit 20, the detection signal format, the arrangement determination processing in the signal processor 25, and the like will be described later in detail.

The source driver 27 may apply a data voltage to a data line DL to drive a pixel connected to the data line DL. The gate driver 28 may sequentially supply a scan signal (high level or low level) to gate lines GL, and sequentially operate pixels connected to the gate lines GL among the pixels constituting the display panel 29. The timing controller 26 may collectively control the source driver 27 and the gate driver 28 based on the input signal input from the signal processor 25. Specifically, the timing controller 26 may parallelize the video input signal as a serial signal, and control the data voltage to be applied to each data line DL in accordance with a timing of scanning the gate line GL. As described above, an image output processing may be performed in the timing controller 26, the source driver 27, and the gate driver 28 based on the input signal, and an image based on the input signal is displayed on the display panel 29.

Figure 2:
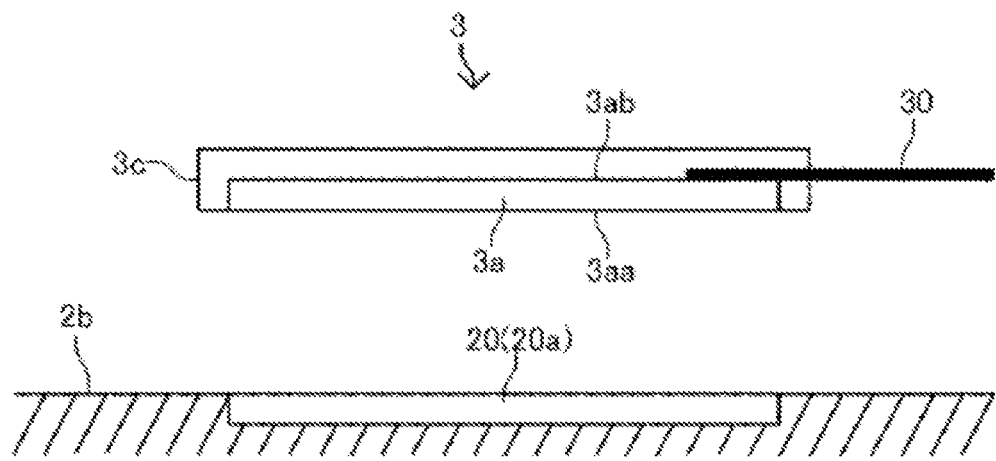
FIG. 2 is a side view illustrating a connector unit of a display device and an interface unit according to a first embodiment of the present disclosure.
Figure 3:
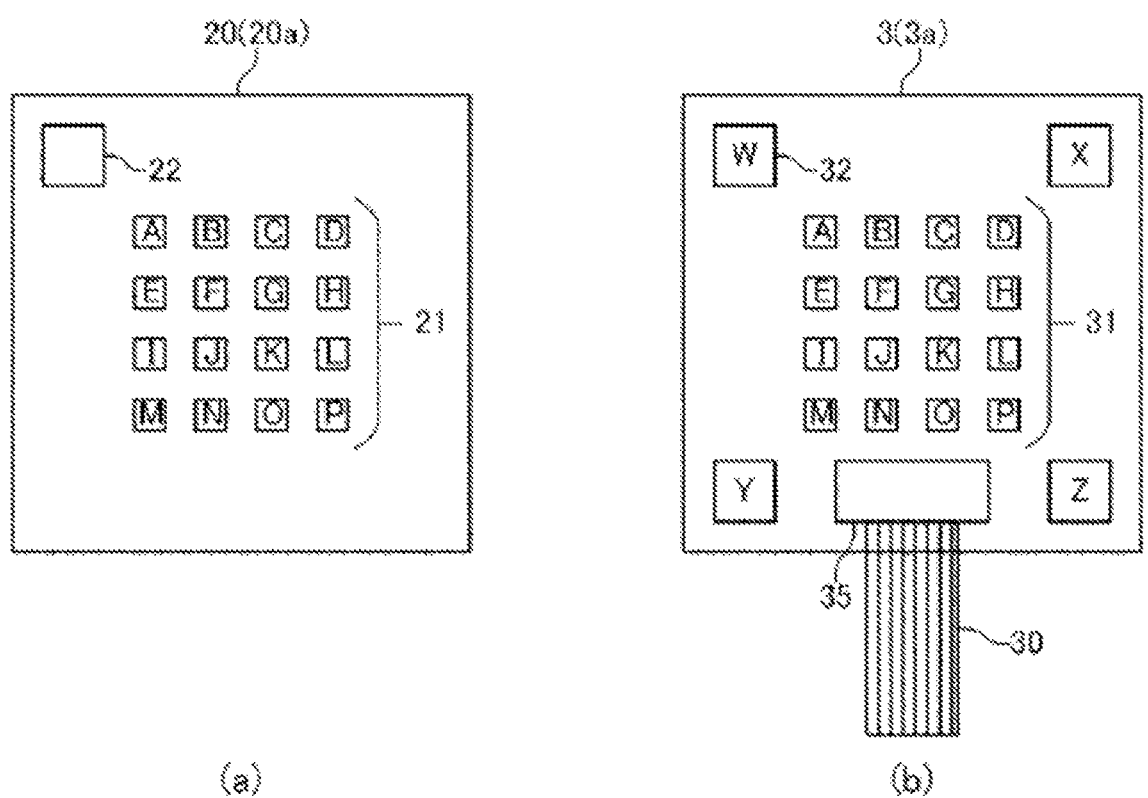
FIG. 3 is a plan view illustrating a connector unit of a display device and an interface unit according to a first embodiment of the present disclosure.

A configuration of the connector unit 20 and the interface unit 3 of the display device 2 of this embodiment is explained with reference to FIGS. 2 and 3. FIG. 2 is a side view of the connector unit 20 and the interface unit 3. FIG. 3(a) is a plan view of the connector unit 20, and FIG. 3(b)

is a plan view of the interface unit 3. Each figure is a schematic view and is not limited to a dimension.

As shown in FIG. 2, the connector unit 20 may include a substrate 20a provided at an outer wall of a back surface 2b of the display device 2, and the back surface 2b is a surface opposing the display surface of the display device 2. The interface unit 3 may include a substrate 3a and a housing 3c covering the substrate 3a, and may have a flat plate shape as a whole. When connecting the interface unit 3 to the connector unit 20, a surface of the substrate 3a which opposes the connector unit 20 may be referred to as a main surface 3aa, and a surface opposing the main surface 3aa may be referred to as a back surface 3ab. One end of an input signal cable 30 (hereinafter referred to as a cable 30) may be mounted and fixed to the substrate 3a at one end of the back surface 3ab, and components of the interface unit 3 may become up to the other end (not shown) of the cable 30. Thus, the cable 30 may constitute a part or all of the cable C shown in FIG. 1. In a case that the cable 30 is a part of the cable C, the other end of the cable 30 may be connected to one end of a separate cable via a suitable connector, and the other end of the separate cable may be connected to the image generating device 4. In a case that the cable 30 is all of the cable C, the other end of the cable 30 may be connected to the image generating device 4.

When connecting the interface unit 3 to the connector unit 20, a position of the substrate 3a may be determined at a predetermined part thereof with respect to the substrate 20a, and the main surface 3aa may be arranged facing an outer surface of the substrate 20a. The positioning of the interface unit 3 and the connector unit 20 may be made by, for example, an attractive force between a magnet (not shown) disposed at the interface unit 3, and a magnetic body (not shown) (i.e., a member that exhibits an attraction force to the magnet of the interface unit 3) or a magnet (not shown) (i.e., a magnet having a polarity opposite to that of the magnet of the interface unit 3) disposed at the connector unit 20. Alternatively, the positioning of the interface unit 3 and the connector unit 20 may be made by, for example, an attractive force between a magnet (not shown) disposed at the connector unit 20, and a magnetic body (not shown) (i.e., a member that exhibits an attraction force to the magnet of the connector unit 20) or a magnet (not shown) (i.e., a magnet having a polarity opposite to that of the magnet of the connector unit 20) disposed at the interface unit 3.

In this embodiment, with respect to a signal transmission between the interface unit 3 and the connector unit 20 (between opposing electrodes or opposing terminals), the substrate 3a and the substrate 20a may be coupled in a non-contact state by a electromagnetic field coupling, i.e., may be coupled by a wireless transmission. Alternatively, the substrate 3a and the substrate 20a may be electrically coupled by a physical contact using a contact pin or the like. In the case of non-contact coupling, the substrate 20a may be provided at an inner wall of the back surface 2b.

FIG. 3(a) is a plan view of the connector unit 20 (the substrate 20a) viewed from the interface unit 3 side. The connector unit 20 may include receiving electrodes 21A to 21P and a terminal 22 for detecting a receiving-side connection direction (hereinafter, a receiving-side detection terminal). In each figure, the receiving electrodes 21A to 21P are shown by alphabet A to P represented in respective electrodes, for clarity of drawings. In the following description, the receiving electrodes 21A to 21P may be collectively referred to as a receiving electrode 21, or any one of the receiving electrodes 21A to 21P may be referred to as a receiving electrode 21. Each of the receiving electrode 21 and the receiving-side detection terminal 22 may be connected to the signal processor 25 through a wiring not shown.

In this embodiment, the receiving electrodes 21A to 21P are arranged in a 4×4 square matrix. However, a number of the receiving electrodes 21 is not limited to 16, and an appropriate number of the receiving electrodes 21 may be used according to a specification of the display device 2 or a specification of the input signal. For example, in a case that the receiving electrodes 21 are a substitute for HDMI (registered trademark) terminals (e.g., 19 pins), the receiving electrodes 21 may be arranged in a 5×5 square matrix, six electrodes of the arranged electrodes may become non-used electrodes. Alternatively, in a case that the receiving electrodes 21 are a substitute for Display Port terminals (e.g., 20 pins), the receiving electrodes 21 may be arranged in a 5×5 square matrix, and five electrodes of the arranged electrodes may become non-used electrodes.

Further, as can be seen from the description below, as long as the arrangement of the receiving electrode 21 is rotationally symmetrical, the arrangement is not limited to the square shape and may have a regular octagon shape, a cross shape, a 卍 shape, a circle shape, a square rim shape, a regular octagon rim shape, a ring or a combination thereof. Further, in the present disclosure, a 90 degree rotation symmetry may mean an aspect that even if all receiving electrodes 21 are rotated 90 degrees, 180 degrees or 270 degrees with a rotational center position as a center of all receiving electrodes 21 within a plane formed by all receiving electrodes 21, the arrangement of all receiving electrodes 21 becomes the same shape in appearance. Further, a shape of each of the receiving electrodes 21 may not be a square shape as shown, and may be a polygon shape, a circle shape, etc., other than the square shape.

Further, even though the receiving electrodes 21 are arranged in a square lattice shape and are configured to be 90 degree rotationally symmetrical in this embodiment, the arrangement of the receiving electrodes 21 is not limited to a square lattice shape. For example, the receiving electrode 21 may be arranged in a hexagonal lattice shape and be configured to be 60 degrees rotationally symmetrical.

The receiving-side detection terminal 22 may be disposed at a predetermined position (e.g., at a corner portion of the connector unit 20) outside the square matrix of the receiving electrodes 21A to 21P. As described later in detail, the receiving-side detection terminal 22 may be disposed at a position other than the center position of the receiving electrodes 21A to 21P.

FIG. 3(b) is a transmissive plan view when the interface unit 3 (the substrate 3a) is viewed from the back surface 3ab side. The interface unit 3 may include a cable 30, transmission electrodes 31A to 31P, terminals 32W to 32Z for detecting a transmission-side connection direction (hereinafter, referred to as a transmission-side detection terminals), and a control circuit 35. In each figure, for clarity of drawings, the transmission electrodes 31A to 31P are shown by alphabet A-P represented in respective electrodes, and the transmission-side detection terminals 32W to 32Z are shown by the alphabet W-Z represented in respective terminals. In the following description, the transmission electrodes 31A to 31P may be collectively referred to as a transmission electrode 31, or any one of the transmission electrodes 31A to 31P may be referred to as a transmission electrode 31. The transmission-side detection terminals 32W to 32Z may be collectively referred to as a transmission-side detection terminals 32, or any one of the transmission-side detection terminals 32W to 32Z may be referred to as a transmission-side detection terminals 32. The cable 30 may be connected to the control circuit 35, and the control circuit 35 may be connected to each of the transmission electrode 31 and the transmission side detection terminal 32 through a wiring not shown.

Similarly to the receiving electrodes 21A to 21P, transmission electrodes 31A to 31P are arranged in a 4×4 square matrix. However, a number of the transmission electrodes 31 is not limited to 16, and an appropriate number of the transmission electrodes 31 may be used according to a specification of the interface unit 3 or a specification of the input signal. For example, in a case that the transmission electrodes 31 are a substitute for HDMI (registered trademark) terminals (e.g., 19 pins), the transmission electrodes 31 may be arranged in a 5×5 square matrix, six electrodes of the arranged electrodes may become non-used electrodes. Alternatively, in a case that the transmission electrodes 31 are a substitute for Display Port terminals (e.g., 20 pins), the transmission electrodes 31 may be arranged in a 5×5 square matrix, and five electrodes of the arranged electrodes may become non-used electrodes. Further, if the non-used electrodes exist in the transmission electrodes 31, such the electrodes (for example, electrode pads) do not need to be provided.

Similarly to the receiving electrodes 21A to 21P, as long as the arrangement of the transmission electrodes 31 is rotationally symmetrical, the arrangement is not limited to the square shape and may have a regular octagon shape, a cross shape, a 卍 shape, a circle shape, a square rim shape, a regular octagon rim shape, a ring or a combination thereof. The arrangement of the transmission electrodes 31 is not limited to the square lattice shape, similarly to the receiving electrodes 21. The arrangement of the transmission electrodes 31A to 31P correspond to the arrangement of the receiving electrodes 21A to 21P. In other words, The interface unit 3 is positioned relative to the connector unit 20 such that all transmission electrodes 31 respectively coincide and oppose all receiving electrodes 21. A shape of each of the transmission electrodes 31 may not be a square shape, and may be a polygon shape, a circle shape, etc.

In the present disclosure, for the purpose of explanations, a connection state (in-plane rotation angle=0) that the interface unit 3 is not rotated in-plane with respect to the connector unit 20 and the transmission electrode 31A corresponds to the receiving electrode 21A is referred to as a 0 degree rotation connection. Further, a connection state (in-plane rotation angle=90 degrees) that the interface unit 3 is rotated in-plane 90 degrees counterclockwise with respect to the connector unit 20 and the transmission electrode 31A corresponds to the receiving electrode 21M is referred to as a 90 degree rotation connection. Further, a connection state (in-plane rotation angle=180 degrees) that the interface unit 3 is rotated in-plane 180 degrees with respect to the connector unit 20 and the transmission electrode 31A corresponds to the receiving electrode 21P is referred to as a 180 degree rotation connection. Further, a connection state (in-plane rotation angle=−90 or 270 degrees) that the interface unit 3 is rotated in-plane 90 degrees clockwise or 270 degrees counterclockwise with respect to the connector unit 20 and the transmission electrode 31A corresponds to the receiving electrode 21D is referred to as a −90 degree rotation connection or a 270 degree rotation connection. In the signal processor 25, an arrangement holding processing is performed in a case of the 0 degree rotation connection, and a rearrangement processing is performed in a case of a 90 degree rotation connection, a 180 degree rotation connection, and a −90 degree rotation connection.

In this embodiment, the transmission-side detection terminals 32W-32Z may be arranged by 90 degree rotation symmetry with respect to the center position of all transmission electrodes 31 on the substrate 3a of the interface unit 3. For example, the transmission-side detection terminal 32W may be disposed at an edge of the substrate near the transmission electrode 31A, the transmission-side detection terminal 32X may be disposed at an edge of the substrate near the transmission electrode 31D, the transmission-side detection terminal 32Y may be disposed at an edge of the substrate near the electrode 31M, and the transmission-side detection terminal 32Z may be disposed at an edge of the substrate near the transmission electrode 31P. Under this situation, any one of the transmission-side detection terminals 32 may coincide with the receiving-side detection terminal 22 according to the connection direction.

As described above, the transmission side detection terminal 32 may be supplied with, for example, a 2-bit signal. For example, a pulse modulation signal indicating '00' for the transmitting-side detection terminal 32W, a pulse modulation signal indicating '01' for the transmission-side detection terminal 32X, a pulse modulation signal indicating '10' for the transmission-side detection terminal 32Y, and a pulse modulation signal indicating '11' for the transmitting side detection terminal 32Z may be supplied. Alternatively, DC fixed voltages of four values may be supplied to the transmission-side detection terminals 32. For example, 0V may be supplied to the transmission-side detection terminal 32W, 1.7V may be supplied to the transmission-side detection terminal 32X, 3.3V may be supplied to the transmission-side detection terminal 32Y, and 5V may be supplied to the transmission-side detection terminal 32Z.

The control circuit 35 may be, for example, a control IC, and may be configured to supply input signals input from the cable 30 to the corresponding transmission electrodes 31. Further, the control circuit 35 may convert the input signals in a predetermined signal format and then supply the converted input signals to the corresponding transmission electrodes 31, as needed. Further, the control circuit 35 may generate predetermined detection signals using the input signal as a power source, and supply the detection signals to the respective transmission-side detection terminals 32. In other words, when the input signals from the image generating device 4 are input to the control circuit 35, the input data may be supplied to the transmission electrodes 31A to 31P in a predetermined arrangement, and four types of detection signals may be transmitted to the transmission-side detection terminal 32W to 32Z. Further, the input data may be transmitted from each of the transmission electrodes 31 to each of the receiving electrodes 21 in a non-contact or contact manner while the detection signal may be transmitted from one of the transmission-side detection terminals 32W to 32Z to the receiving-side detection terminal 22 in a non-contact or contact manner. Alternatively, the contact signal is transmitted, and the input signals and the detection signal may be relayed from the connector unit 20 to the signal processor 25.

Figure 4A:
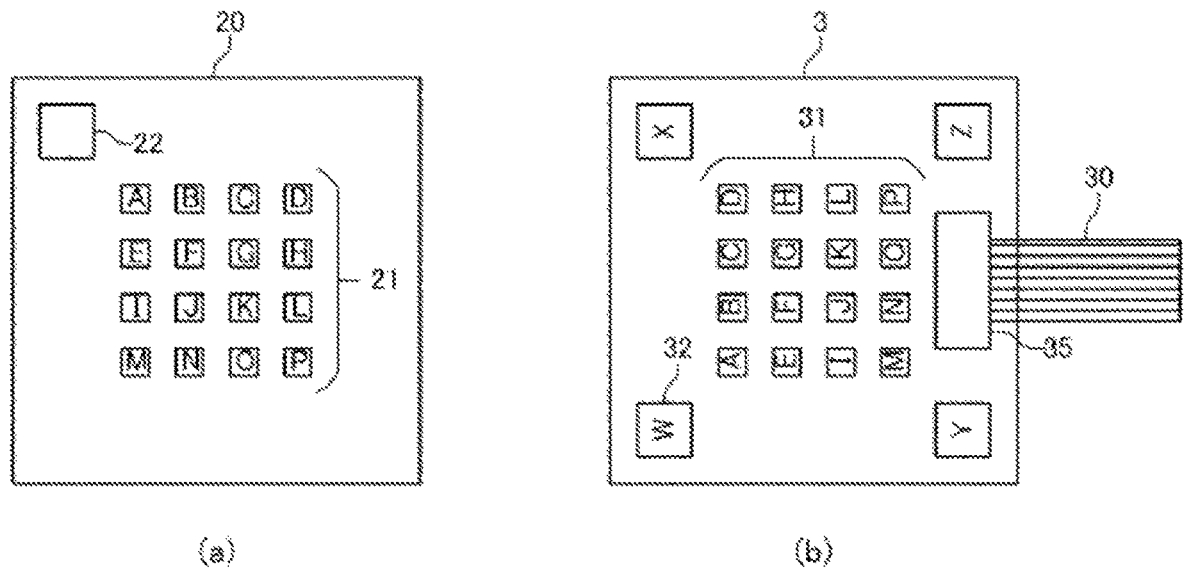
FIG. 4A to 4C are views explaining rearrangements of input data according to a first embodiment of the present disclosure.
Figure 4B:
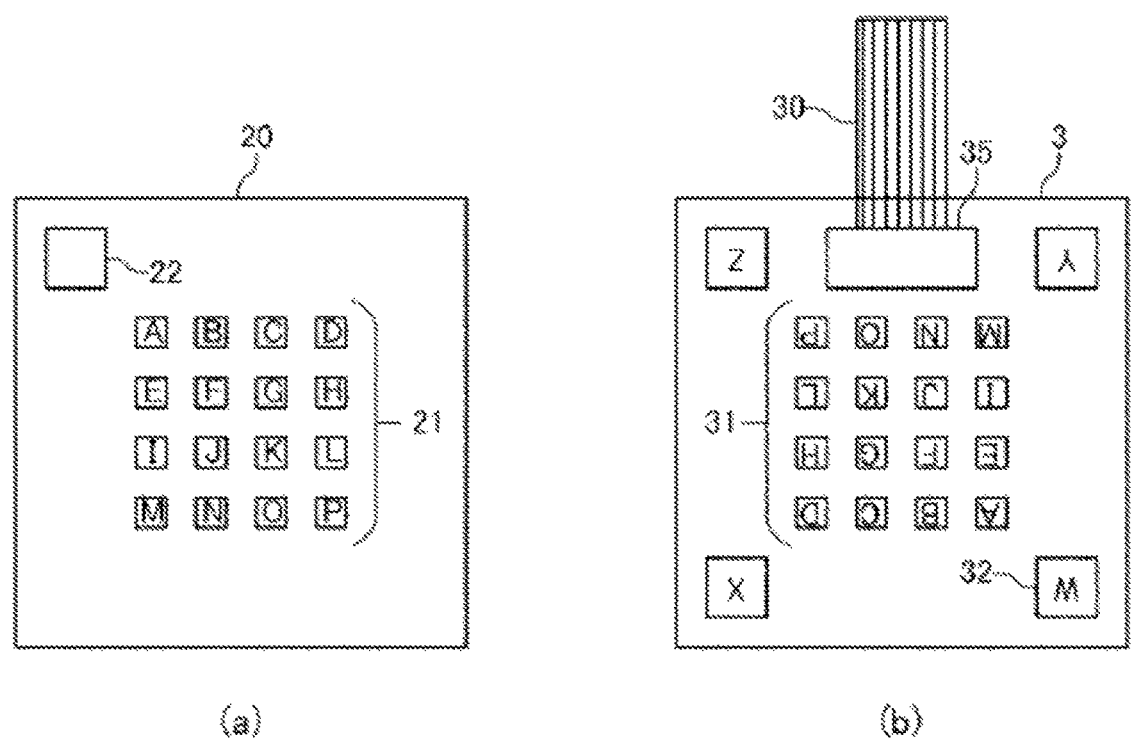
Figure 4C:
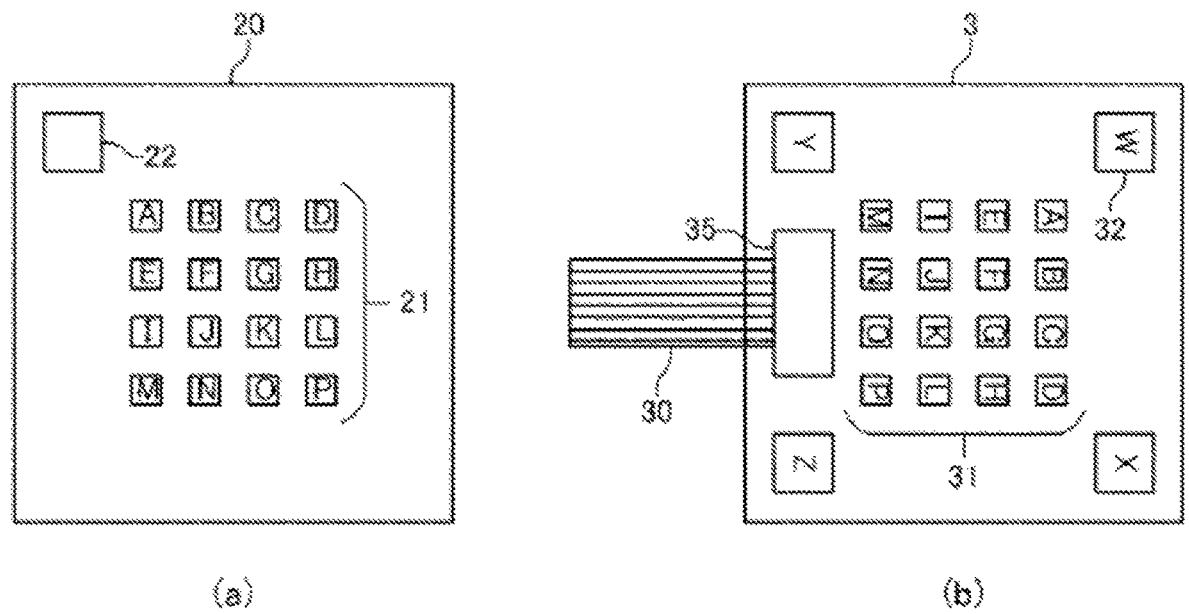

The arrangement determination processing, in particular, the rearrangement processing in the signal processor 25 is explained with reference to FIGS. 4A to 4C. FIGS. 4A, 4B and 4C show correspondence relationship between the transmission electrode 31 and the transmission-side detection terminal 32, and the receiving electrode 21 and the receiving-side detection terminal 22 in a case of the 90 degree rotation connection, in a case of the 180 degree rotation connection, and in a case of the −90 degree rotation connection, respectively. Further, in each of FIGS. 4A to 4C, a left figure (a) shows a plan view of the connector unit 20, and the right figure (b) shows a transmissive plan view when the interface unit 3 is viewed from the back surface 3ab side.

In FIG. 4A, the receiving side detection terminal 22 may correspond to the transmission-side detection terminal 32X. Accordingly, the direction identifier 251 may identify a 90 degree rotation connection based on a detection signal (e.g., a pulse modulation signal indicating '01' or a DC fixed signal of 1.7V (in case of contact transmission)) supplied from the transmission-side detection terminal 32X. Further, a correspondence relationship of the receiving electrodes 21 and the transmission electrodes 31 may be represented by symbols as follows: 21A=31D, 21B=31H, 21C=31L, 21D=31P, 21E=31C, 21F=31G, 21G=31K, 21H=31O, 21I=31B, 21J=31F, 21K=31J, 21L=31N, 21M=31A, 21N=31E, 21O=31I and 21P=31M. Thus, the arrangement determiner 252 may convert the input data from the transmission electrode 31, 31D→31A, 31H→31B, 31L→31C, 31P→31D, 31C→31E, 31G→31F, 31K→31G, 31O→31H, 31B→31I, 31F→31J, 31J→31K, 31N→31L, 31A→31M, 31E→31N, 31I→31O and 31M→31P, to rearrange the input data. The signal processor 25 outputs the rearranged input data as an input signal to the timing controller 26. Accordingly, the display output portion (the timing controller 26, the source driver 27, the gate driver 28, and the display panel 29) may perform a display output on the display panel 29 by the same image output processing as in the 0 degree rotation connection.

In FIG. 4B, the receiving side detection terminal 22 may correspond to the transmission-side detection terminal 32Z. Accordingly, the direction identifier 251 may identify a 180 degree rotation connection based on a detection signal (e.g., a pulse modulation signal indicating '11' or a DC fixed signal of 5V (in case of contact transmission)) supplied from the transmission-side detection terminal 32X. Further, a correspondence relationship of the receiving electrodes 21 and the transmission electrodes 31 may be represented by symbols as follows: 21A=31P, 21B=31O, 21C=31N, 21D=31M, 21E=31L, 21F=31K, 21G=31J, 21H=31I, 21I=31H, 21J=31G, 21K=31F, 21L=31E, 21M=31D, 21N=31C, 21O=31B and 21P=31A. Thus, the arrangement determiner 252 may convert the input data from the transmission electrode 31, 31P→31A, 31O→31B, 31N→31C, 31M→31D, 31L→31E, 31K→31F, 31J→31G, 31I→31H, 31H→31I, 31G→31J, 31F→31K, 31E→31L, 31D→31M, 31C→31N, 31B→31O and 31A→31P, to rearrange the input data. The signal processor 25 outputs the rearranged input data as an input signal to the timing controller 26. Accordingly, the display output portion may perform a display output on the display panel 29 by the same image output processing as in the 0 degree rotation connection.

In FIG. 4C, the receiving side detection terminal 22 may correspond to the transmission-side detection terminal 32Y. Accordingly, the direction identifier 251 may identify a −90 degree rotation connection based on a detection signal (e.g., a pulse modulation signal indicating '10' or a DC fixed signal of 3.3V (in case of contact transmission)) supplied from the transmission-side detection terminal 32X. Further, a correspondence relationship of the receiving electrodes 21 and the transmission electrodes 31 may be represented by symbols as follows: 21A=31M, 21B=31I, 21C=31E, 21D=31A, 21E=31N, 21F=31J, 21G=31F, 21H=31B, 21I=31O, 21J=31K, 21K=31G, 21L=31C, 21M=31P, 21N=31L, 21O=31H and 21P=31D. Thus, the arrangement determiner 252 may convert the input data from the transmission electrode 31, 31M→31A, 31I→31B, 31E→31C, 31A→31D, 31N→31E, 31J→31F, 31F→31G, 31B→31H, 31O→31I, 31K→31J, 31G→31K, 31C→31L, 31P→31M, 31L→31N, 31H→31O and 31D→31P, to rearrange the input data. The signal processor 25 outputs the rearranged input data as an input signal to the timing controller 26. Accordingly, the display output portion may perform a display output on the display panel 29 by the same image output processing as in the 0 degree rotation connection.

As described above, the timing controller 26 may control the source driver 27 and the gate driver 28 by the same processing regardless of the connection direction of the interface unit 3 to the connector unit 20. In other words, in the display device 2 including the existing display output portion, the operation of this embodiment may be obtained by adding the connector unit 20 and the signal processor 25 to a front end of the display device 2.

Modified Embodiments of Connection Direction Identification

An identification method of a connection direction is not limited to using the receiving-side detection terminal 22 and the transmission-side detection terminals 32W-32Z, and other various identification methods may be adopted. Hereinafter, modified embodiments of identification methods of a connection direction are described. In each modified embodiment, a difference from the above embodiment is mainly described, and explanation of the same or like parts may be omitted or simplified.

(1) First Modified Embodiment

Figure 5:
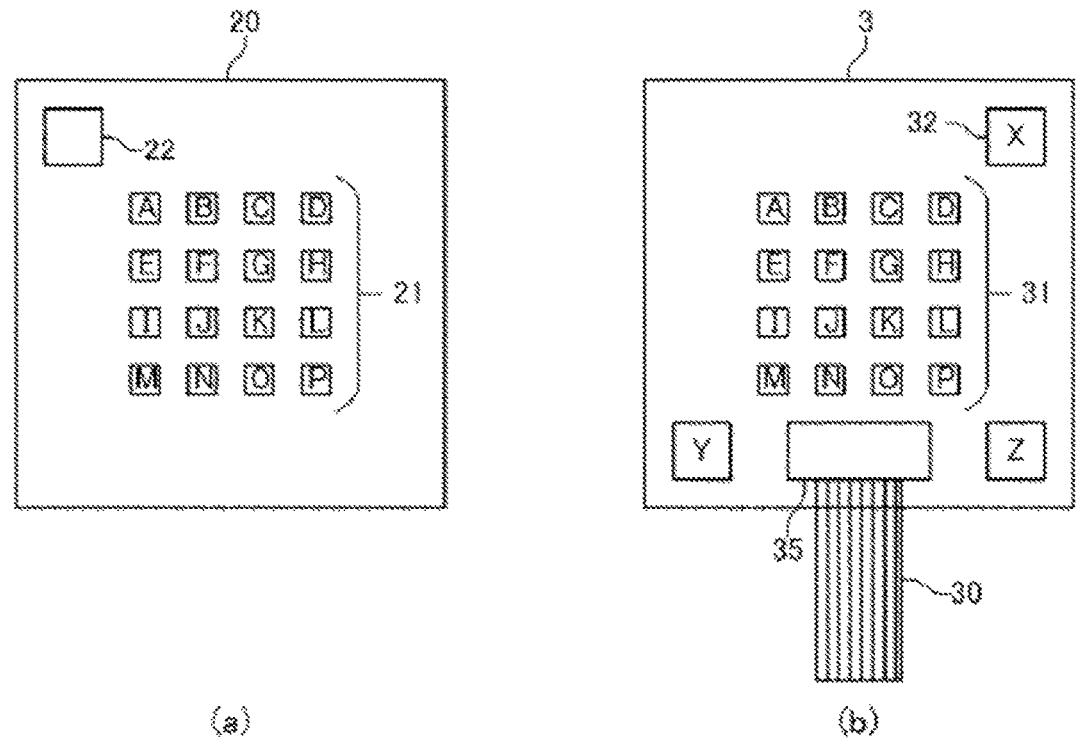
FIG. 5 is a plan view illustrating a connector unit of a display device and an interface unit according to a first modified embodiment of the present disclosure.

In the above embodiment, the configuration which uses one receiving-side detection terminal 22 and four transmission-side detection terminals 32 is described. In this modified embodiment, a configuration which uses one receiving-side detection terminal 22 and three transmission-side detection terminals 32 may be described. In FIG. 5 of this modified embodiment, a plan view (a left figure (a)) of a connector unit 20, and a transmissive plan view (a right figure (b)) when an interface unit 3 is viewed from a back surface 3ab side are shown (in a case of 0 degree rotation connection).

The interface unit 3 may include transmission-side detection terminals 32X, 32Y, and 32Z. 2-bit signals may be supplied to the transmission-side detection terminals 32. For example, a pulse modulation signal indicating '01' for the transmission-side detection terminal 32X, a pulse modulation signal indicating '10' for the transmission-side detection terminal 32Y, and a pulse modulation signal indicating '11' for the transmission-side detection terminal 32Z may be supplied. Alternatively, in a case of a contact transmission, a DC fixed voltages of three values may be supplied to the transmission-side detection terminals 32. For example, 1.7V may be supplied to the transmission-side detection terminal 32X, 3.3V may be supplied to the transmission-side detection terminal 32Y, and 5V may be supplied to the transmission-side detection terminal 32Z.

In a case of a 0 degree rotation connection, any one of the transmission-side detection terminals 32X to 32Z may not correspond to the receiving-side detection terminal 22. A direction identifier 251 may identify the 0 degree rotation connection based on this no-input state, and an arrangement determiner 252 may perform an arrangement holding processing as a default setting processing (i.e., may not perform the rearrangement processing). In a case of a 90 degree rotation connection, the receiving-side detection terminal 22 may correspond to the transmission-side detection terminal 32X. Accordingly, the direction identifier 251 may identify the 90 degree rotation connection based on a detection signal (e.g., a pulse modulation signal indicating '01' or a DC fixed signal of 1.7 V) from the transmission-side detection terminal 32X, and the arrangement determiner 252 may perform the rearrangement processing of the input data described with reference to FIG. 4A. In a case of a 180 degree rotation connection, the transmission-side detection terminal 32Y may correspond to the receiving-side detection terminal 22. Accordingly, the direction identifier 251 may identify the 180 degree rotation connection based on a detection signal (e.g., a pulse modulation signal indicating '10' or a DC fixed signal of 3.3V) from the transmission-side detection terminal 32Y, and the arrangement determiner 252 may perform the rearrangement processing of the input data described with reference to FIG. 4B. In a case of a −90 degree rotation connection, the receiving-side detection terminal 22 may correspond to the transmission-side detection terminal 32Z. Accordingly, the direction identifier 251 may identify the −90 degree rotational connection based on a detection signal (for example, a pulse modulation signal indicating '11' or a DC fixed signal of 5V) from the transmission-side detection terminal 32Z, and the arrangement determiner 252 may perform the rearrangement processing of the input data described with reference to FIG. 4C. By this modified embodiment, a number of the transmission-side detection terminals 32 may be reduced, and the interface unit 3 may be made at low cost.

(2) Second Modified Embodiment

Figure 6:
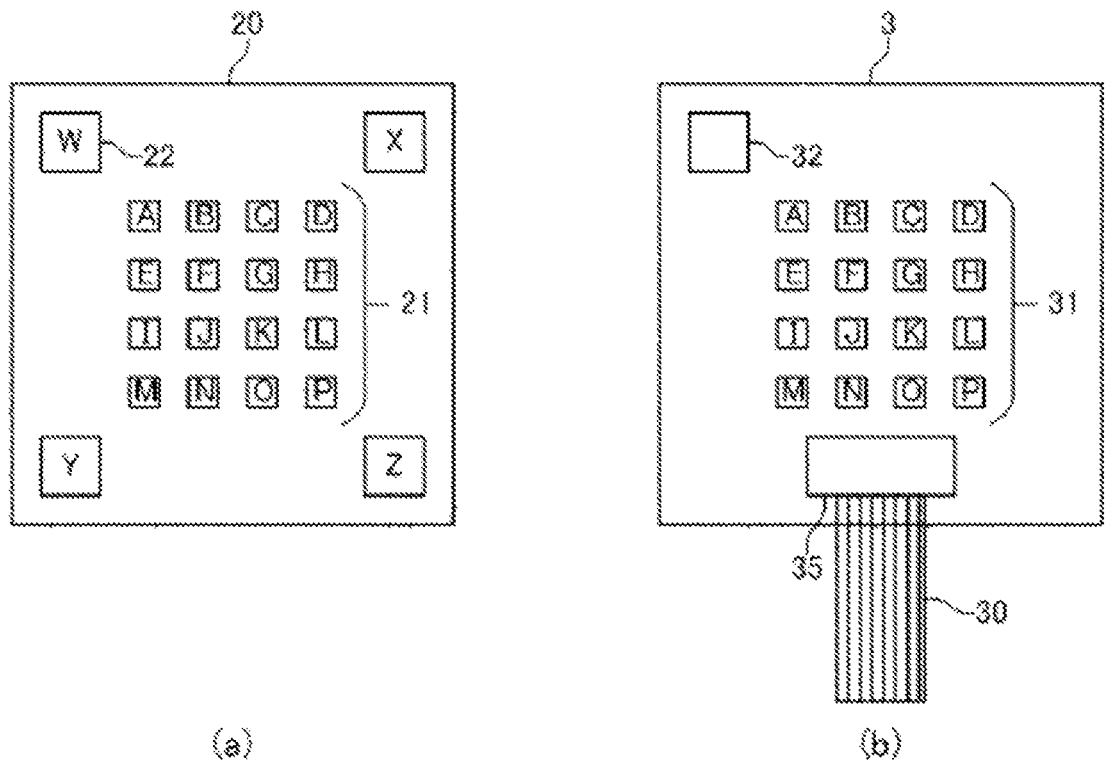
FIG. 6 is a plan view illustrating a connector unit of a display device and an interface unit according to a second modified embodiment of the present disclosure.

In the above first embodiment, the configuration which uses one receiving-side detection terminal 22 and four transmission-side detection terminals 32 is described. In this modified embodiment, a configuration which uses four receiving-side detection terminals 22 and one transmission-side detection terminal 32 may be described. In FIG. 6 of this modified embodiment, a plan view (a left figure (a)) of a connector unit 20, and a transmissive plan view (a right figure (b)) when an interface unit 3 is viewed from a back surface 3ab side are shown (in a case of 0 degree rotation connection).

The connector unit 20 may include receiving-side detection terminals 22W, 22X, 22Y and 22Z. The receiving-side detection terminals 22W to 22Z may be collectively referred to as a receiving-side detection terminal 22, or any one of the receiving-side detection terminals 22W to 22Z may be referred to as a receiving-side detection terminal 22. In each figure, for clarity of drawings, the receiving-side detection terminals 22W-22Z are shown by alphabet W to Z represented in respective terminals. The interface unit 3 may include the transmission-side detection terminal 32. For example, a predetermined pulse modulation signal may be supplied to the transmission-side detection terminal 32. Alternatively, in a case of a contact transmission, for example, a proper detection signal such as a DC fixed value (e.g., 5V) may be supplied to the transmission-side detection terminal 32. The direction identifier 251 may identify a connection direction based on which of the receiving-side detection terminals 22W to 22Z receives the detection signal.

In a case that the detection signal is received at the receiving-side detection terminal 22W, the direction identifier 251 may identify a 0 degree rotation connection, and the arrangement determiner 252 may perform an arrangement holding processing (i.e., may not perform an rearrangement processing). When the detection signal is received at the receiving-side detection terminal 22Y, the direction identifier 251 may identify a 90 degree rotation connection, and the arrangement determiner 252 may perform the rearrangement processing of the input data described with reference to FIG. 4A. When the detection signal is received at the receiving-side detection terminal 22Z, the direction identifier 251 may identify a 180 degree rotation connection, and the arrangement determiner 252 may perform the rearrangement processing of the input data described with reference to FIG. 4B. When the detection signal is received at the receiving-side detection terminal 22X, the direction identifier 251 may identify a −90 degree rotation connection, and the arrangement determiner 252 may perform the rearrangement processing of the input data described with reference to FIG. 4C.

By this modified embodiment, the configuration of the detection signal may be simplified, and the control circuit 35 (i.e., the interface unit 3) may be made at low cost. Further, the receiving-side detection terminal 22W may be omitted, and in this case, the signal processor 25 may be configured to perform the arrangement holding processing as a default setting processing (i.e., may be configured to perform no rearrangement processing) according to the non-input state of the detection signal, in the same manner as in the 0 degree rotation connection of the first modified embodiment. Therefore, a number of the receiving-side detection terminals 22 may be reduced, and the connector unit 20 (i.e., the display device 2) may be made at low cost.

(3) Third Modified Embodiment

Figure 7:
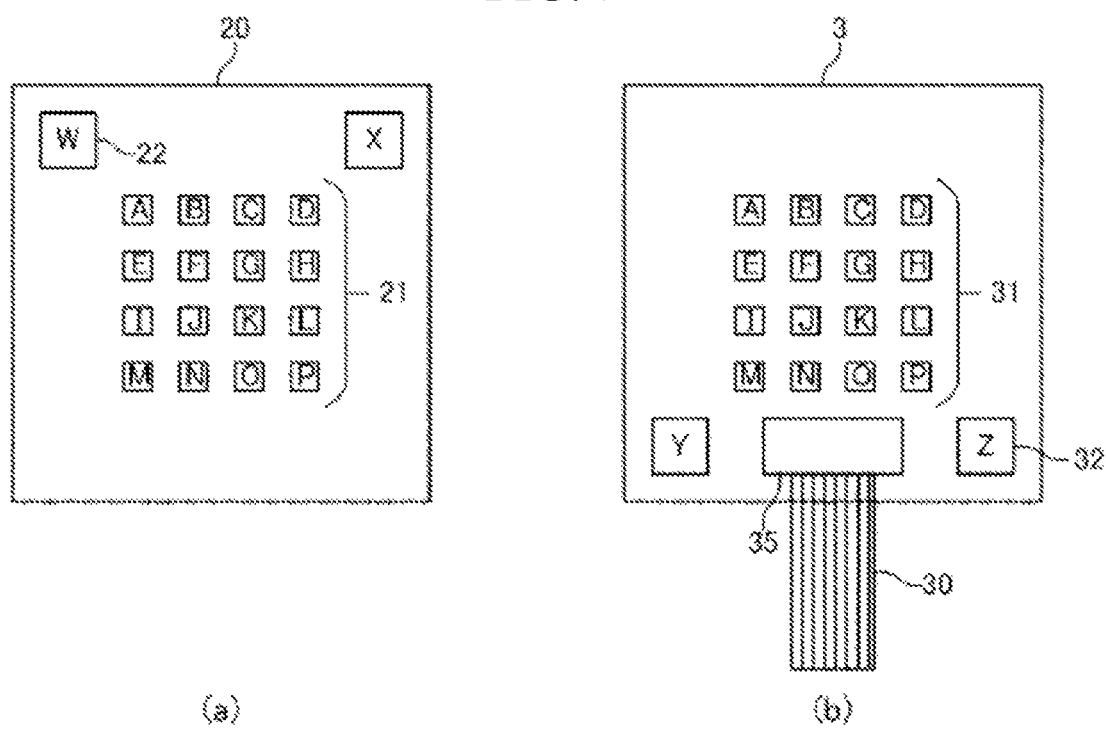
FIG. 7 is a plan view illustrating a connector unit of a display device and an interface unit according to a third modified embodiment of the present disclosure.

In the above first embodiment, the configuration which uses one receiving-side detection terminal 22 and four transmission-side detection terminals 32 is described. In this modified embodiment, a configuration which uses two receiving-side detection terminals 22 and two transmission-side detection terminals 32 may be described. In FIG. 7 of this modified embodiment, a plan view (a left figure (a)) of a connector unit 20, and a transmissive plan view (a right figure (b)) when an interface unit 3 is viewed from a back surface 3ab side are shown (in a case of 0 degree rotation connection).

The connector unit 20 may include receiving-side detection terminals 22W and 22X. The interface unit 3 may include transmission-side detection terminals 32Y and 32Z. For example, predetermined pulse modulation signals may be supplied to the transmission side detection terminals 32Y and 32Z (the pulse modulation signals may be the same signal). Alternatively, in a case of a contact transmission, for example, a detection signal such as a DC fixed value (e.g., 5V) may be supplied to each of the transmission-side detection terminals 32Y and 32Z. The direction identifier 251 may recognize the presence or absence of the detection signals being input at the respective receiving-side detection terminals 22W and 22X as a lower 1 bit and an upper 1 bit, respectively (e.g., 1 when a detection signal is present, and 0 when a detection signal is absent). For example, when there is no detection signal input at the receiving-side detection terminal 22W and there is a detection signal input at the receiving-side detection terminal 22X, this state is identified as '01'.

In a case of a 0 degree rotation connection, any one of the transmission-side detection terminals 32Y to 32Z may not correspond to the receiving-side detection terminals 22W and 22X. The direction identifier 251 may identify the 0 degree rotation connection based on this '00' state, and the arrangement determiner 252 may perform an arrangement holding processing as a default setting process (may not perform the rearrangement processing). In a case of a 90 degree rotation connection, any one of the transmission-side detection terminals 32Y and 32Z may not correspond to the receiving-side detection terminal 22W, and the transmission-side detection terminal 32Z may correspond to the receiving-side detection terminal 22X. The direction identifier 251 may identify the 90 degree rotation connection based on this '01' state, and the arrangement determiner 252 may perform the rearrangement processing of the input data described with reference to FIG. 4A. In a case of a 180 degree rotation connection, both the transmission-side detection terminals 32Y and 32Z may correspond to the receiving-side detection terminals 22W and 22X. The direction identifier 251 may identify the 180 degree rotation connection based on this '11' state, and the arrangement determiner 252 may perform the rearrangement processing of the input data described with reference to FIG. 4B. In a case of a −90 degree rotation connection, the transmission-side detection terminal 32Y may correspond to the receiving-side detection terminal 22W, and any one of the transmission-side detection terminals 32Y and 32Z may not correspond to the receiving-side detection terminal 22X. The direction identifier 251 may identify the −90 degree rotation connection based on this '10' state, and the arrangement determiner 252 may perform the rearrangement processing of the input data described with reference to FIG. 4C.

By this modified embodiment, a total number of the receiving-side detection terminals 22 and the transmission-side detection terminals 32 may be reduced, and the connector unit 20 (i.e., the display device 2) and the interface unit 3 may be made at low cost. Further, the configuration of the detection signal may be simplified, and the control circuit 35 (i.e., the interface unit 3) may be made at lower cost.

(4) Fourth Modified Embodiment

Figure 8:
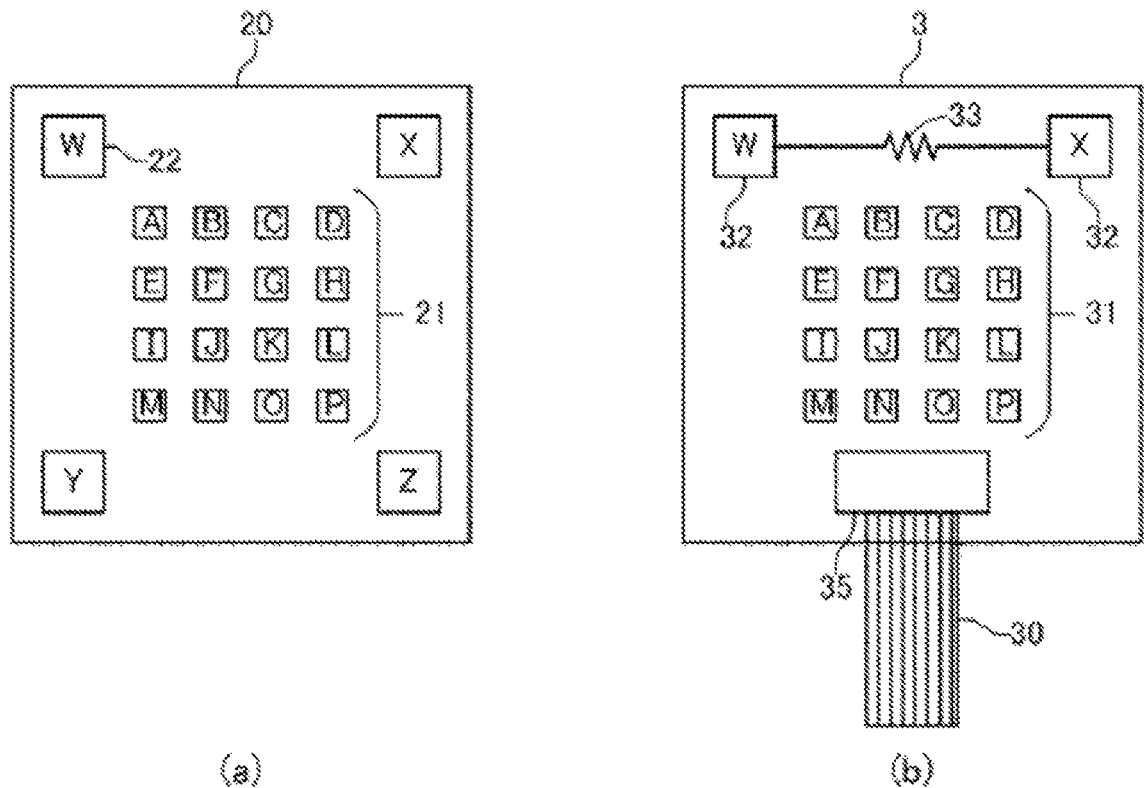
FIG. 8 is a plan view illustrating a connector unit of a display device and an interface unit according to a fourth modified embodiment of the present disclosure.

In the above first embodiment, the configuration in which the control circuit 35 generates the detection signal is described. In this modified embodiment, a configuration in which the control circuit 35 is not involved in the detection signal may be described. In FIG. 8 of this modified embodiment, a plan view (a left figure (a)) of a connector unit 20, and a transmissive plan view (a right figure (b)) when an interface unit 3 is viewed from a back surface 3ab side are shown (in a case of 0 degree rotation connection). This modified embodiment may be effective in the case of the above contact transmission.

The connector unit 20 may include receiving-side detection terminals 22W to 22Z, and the signal processor 25 may apply a voltage to each receiving-side detection terminal in order to impart a potential difference between adjacent terminals among the receiving-side detection terminals 22. The interface unit 3 has a transmission-side detection terminal 32W, a transmission-side detection terminal 32X, and a resistor 33 for connecting the transmission-side detection terminal 32W and the transmission-side detection terminal 32X. The direction identifier 251 may identify a connection direction based on a closed circuit portion formed by the resistor 33. In a case that a closed circuit is formed for the receiving-side detection terminals 22W and 22X, the direction identifier 251 may identify a 0 degree rotation connection, and the arrangement determiner 252 may perform an arrangement holding processing (i.e., may not perform a rearrangement process). In a case that a closed circuit is formed for the receiving-side detection terminals 22W and 22Y, the direction identifier 251 may identify a 90 degree rotation connection, and the arrangement determiner 252 may perform the rearrangement processing of the input data described with reference to FIG. 4A. In a case that a closed circuit is formed for the receiving-side detection terminals 22Y and 22Z, the direction identifier 251 may identify a 180 degree rotation connection, and the arrangement determiner 252 may perform the rearrangement processing of the input data described with reference to FIG. 4B. In a case that a closed circuit is formed for the receiving-side detection terminals 22X and 22Z, the direction identifier 251 may identify a −90 degree rotation connection, and the arrangement determiner 252 may perform the rearrangement processing of the input data described with reference to FIG. 4C.

Further, regarding a definition of the detection signal, a signal which is transmitted from the signal processor 25 to the interface unit 3 and returned to the signal processor, as described above, may also be a detection signal input from the interface unit 3 (i.e., the transmission-side detection terminal 32) to the receiving-side detection terminal 22. Further, in a case that a proper internal resistance is connected between the signal processor 25 (the direction identifier 251) and each receiving-side detection terminal 22, the resistor 33 may only need to serve as a wiring connection (i.e., to serve as a short-circuit connection). According to this modified embodiment, the detection signal generation may be unnecessary, and the control circuit 35 (i.e., the interface unit 3) may be made at low cost or downsized.

(5) Fifth Modified Embodiment

Figure 9:
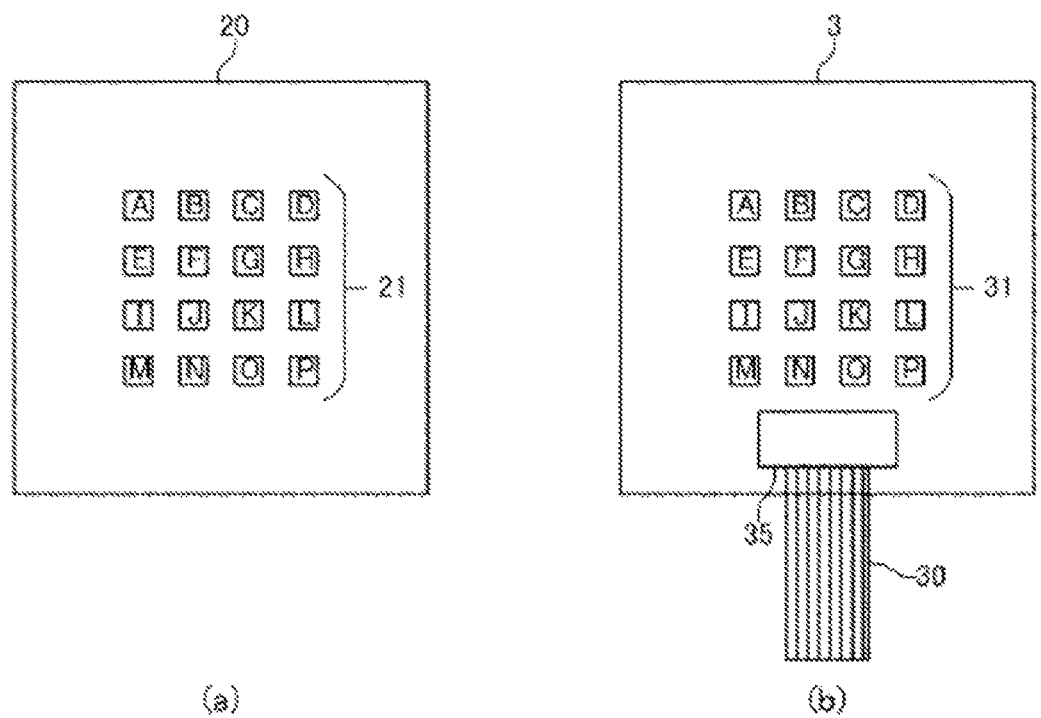
FIG. 9 is a plan view illustrating a connector unit of a display device and an interface unit according to fifth and sixth modified embodiments of the present disclosure.

In the above first embodiment, the configuration in which each of the receiving-side detection terminal 22 and the transmission-side detection terminal 32 are provided independently from each of the receiving electrode 21 and the transmission electrode 31 is described. In this modified embodiment, a configuration in which the detection terminal 32 is a part of the transmission electrodes 31 may be shown. In FIG. 9 of this modified embodiment, a plan view (a left figure (a)) of a connector unit 20, and a transmissive plan view (a right figure (b)) when an interface unit 3 is viewed from a back surface 3ab side are shown (in a case of 0 degree rotation connection).

For example, it is assumed that the transmission electrode 31C among the transmission electrodes 31A to 31P receives a clock signal (e.g., a clock pulse) from the control circuit 35. In a case of a 0 degree rotation connection, the clock signal may be supplied to the receiving electrode 21C corresponding to the transmission electrode 31C. In a case of a 90 degree rotation connection, the clock signal may be supplied to the receiving electrode 21E corresponding to the transmission electrode 31C. In a case of a 180 degree rotation connection, the clock signal may be supplied to the receiving electrode 21N corresponding to the transmission electrode 31C. In a case of a −90 degree rotation connection, the clock signal may be supplied to the receiving electrode 21L corresponding to the transmission electrode 31C.

The direction identifier 251 may identify the connection direction in accordance with which of the receiving electrodes 21C, 21E, 21N and 21L receives the clock signal. In other words, when the clock signal is received at the receiving electrode 21C, the direction identifier 251 may identify the 0 degree rotational connection, and the arrangement determiner 252 may perform the arrangement holding processing (may not perform the rearrangement processing). When the clock signal is received at the receiving electrode 21E, the direction identifier 251 may identify the 90 degree rotation connection, and the arrangement determiner 252 may perform the rearrangement processing of the input data described with reference to FIG. 4A. When the clock signal is received at the receiving electrode 21N, the direction identifier 251 may identify the 180 degree rotation connection, and the arrangement determiner 252 may perform the rearrangement processing of the input data described with reference to FIG. 4B. When the clock signal is received at the receiving electrode 21L, the direction identifier 251 may identify the −90 degree rotation connection, and the arrangement determiner 252 may perform the rearrangement processing of the input data described with reference to FIG. 4C.

In this modified embodiment, the clock signal may also serve as the detection signal. However, if the clock signal does not change depending on the image content and is already known in the signal processor 25, a signal other than the clock signal (e.g., a horizontal synchronization signal, a vertical synchronization signal, or the like) may serve as the detection signal. Further, from the viewpoint of improving the identification accuracy, the connection direction may be identified based on the position of the receiving electrodes where two or more known signals are received.

According to this modified embodiment, the receiving-side detection terminal 22 and the transmission-side detection terminal 32 may become unnecessary, and thus the connector unit 20 (i.e., the display device 2) and the interface unit 3 may be made at low cost or downsized. Further, since the detection signal generation may become unnecessary, the control circuit 35 (i.e., the interface unit 3) may be made at low cost or downsized.

(6) Sixth Modified Embodiment

In the above fifth modified embodiment, the configuration in which a particular or known signal from the image generating device 4 is used as a detection signal is described. In this modified embodiment, a configuration in which the control circuit 35 generates a particular or known signal as a detection signal may be shown. Plan views of the connector unit 20 and the interface unit 3 of this modified embodiment may be the same as those shown in FIG. 9.

For example, it is assumed that the transmission electrode 31F among the transmission electrodes 31A to 31P is a non-used electrode. The control circuit 35 may generate a special signal for a detection signal (hereinafter, referred to as a special detection signal) which is a waveform of a format not included in the input signal, and may supply the special detection signal to the transmission electrode 31F. The special detection signal is assumed to be known in the signal processor 25. In a case of a 0 degree rotation connection, the special detection signal may be supplied to the receiving electrode 21F corresponding to the transmission electrode 31F. In a case of a 90 degree rotation connection, the special detection signal may be supplied to the receiving electrode 21J corresponding to the transmission electrode 31F. In a case of a 180 degree rotation connection, the special detection signal may be supplied to the receiving electrode 21K corresponding to the transmission electrode 31F. In a case of a −90 degree rotational connection, the special detection signal may be supplied to the receiving electrode 21G corresponding to the transmission electrode 31F.

The direction identifier 251 may identify the connection direction according to which of the receiving electrodes 21F, 21J, 21K, and 21G receives the special detection signal. In other words, in a case that the special detection signal is received at the receiving electrode 21F, the direction identifier 251 may identify the 0 degree rotation connection, and the arrangement determiner 252 may perform the arrangement holding processing (i.e., may not perform the rearrangement process). In a case that the special detection signal is received at the receiving electrode 21J, the direction identifier 251 may identify the 90 degree rotation connection, and the arrangement determiner 252 may perform the rearrangement processing of the input data described with reference to FIG. 4A. In a case that the special detection signal is received at the receiving electrode 21K, the direction identifier 251 may identify the 180 degree rotation connection, and the arrangement determiner 252 may perform the rearrangement processing of the input data described with reference to FIG. 4B. In a case that the special detection signal is received at the receiving electrode 21G, the direction identifier 251 may identify the −90 degree rotational connection, and the arrangement determiner 252 may perform the rearrangement processing of the input data described with reference to FIG. 4C.

According to this modified embodiment, the receiving-side detection terminal 22 and the transmission-side detection terminal 32 may become unnecessary, and thus the connector unit 20 (i.e., the display device 2) and the interface unit 3 may be made at low cost or downsized.

(7) Seventh Modified Embodiment

Figure 10:
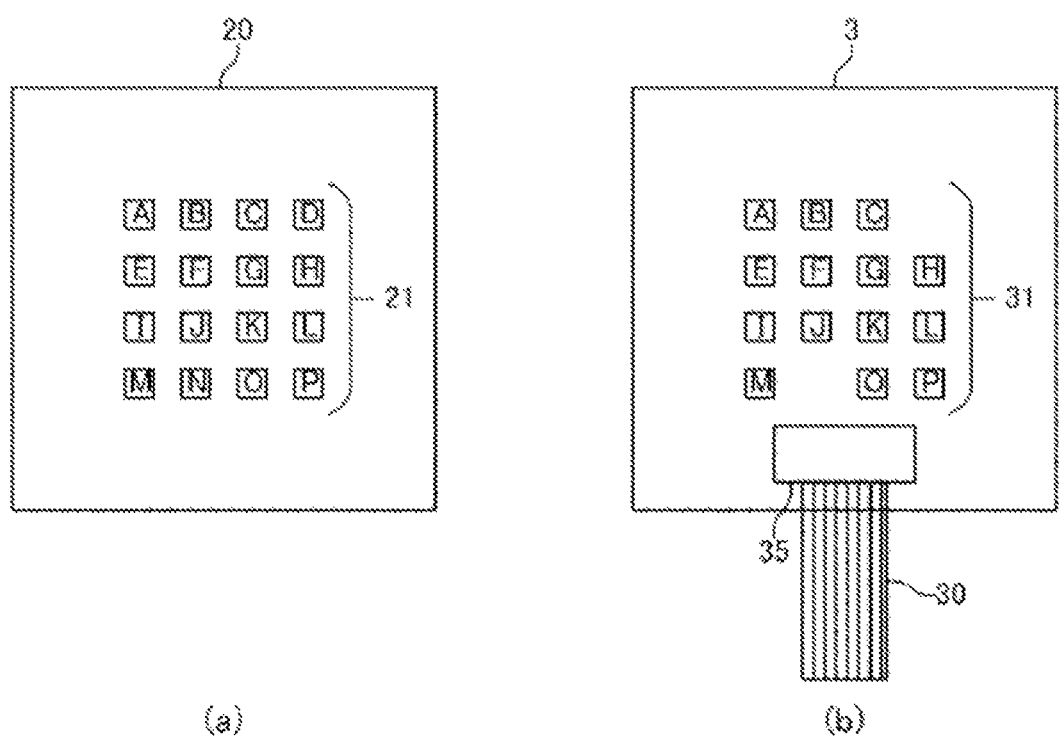
FIG. 10 is a plan view illustrating a connector unit of a display device and an interface unit according to a seventh modified embodiment of the present disclosure.

In the above first embodiment, the configuration in which the transmission-side detection terminal 32 is provided independently from the transmission electrode 31 is described. In this modified embodiment, a configuration, in which when there is a non-used electrode in the transmission electrodes 31, the non-used electrode serves as the transmission-side detection terminal 32, may be described. In FIG. 10 of this modified embodiment, a plan view (a left figure (a)) of a connector unit 20, and a transmissive plan view (a right figure (b)) when an interface unit 3 is viewed from a back surface 3ab side are shown (in a case of 0 degree rotation connection).

For example, it is assumed that the transmission electrodes 31D and 31N among the transmission electrodes 31A to 31P are non-used electrodes. In this modified embodiment, the mounting of the transmission electrodes 31D and 31N is omitted, but the mounting of the transmission electrodes 31D and 31N may be left. In a case of a 0 degree rotation connection, the receiving electrodes 21D and 21N corresponding to the mounting-omitted position of the transmission electrodes 31D and 31N may be in an inputless state. In a case of 90 degree rotation connection, the receiving electrode 21A and 21L corresponding to the mounting-omitted position of the transmission electrodes 31D and 31N may be in an inputless state. In a case of 180 degree rotation connection, the receiving electrodes 21M and 21C corresponding to the mounting-omitted position of the transmission electrodes 31D and 31N may be in an inputless state. In a case of a −90 degree rotation connection, the receiving electrodes 21P and 21E corresponding to the mounting-omitted position of the transmission electrodes 31D and 31N may be in an inputless state.

The direction identifier 251 may identify the connection direction according to which combination of the receiving electrodes 21 becomes the inputless state. In other words, in a case that the receiving electrodes 21D and 21N are in the inputless state, the direction identifier 251 may identify the 0 degree rotation connection, and the arrangement determiner 252 may perform the arrangement holding processing (i.e., may not perform the rearrangement processing). In a case that the receiving electrodes 21A and 21L are in the inputless state, the direction identifier 251 may identify the 90 degree rotation connection, and the arrangement determiner 252 may perform the rearrangement processing of the input data described with reference to FIG. 4A. In a case that the receiving electrodes 21M and 21C are in the inputless state, the direction identifier 251 may identify the 180 degree rotation connection, and the arrangement determiner 252 may perform the rearrangement processing of the input data described with reference to FIG. 4B. In a case that the receiving electrodes 21P and 21E are in the inputless state, the direction identifier 251 may identify the −90 degree rotation connection, and the arrangement determiner 252 may perform the rearrangement processing of the input data described with reference to FIG. 4C.

In this modified embodiment, the configuration which may identify the connection direction using two non-used electrodes is described. However, a configuration which may identify the connection direction using one non-used electrode or three or more non-used electrodes may be adopted. However, in order to distinguish between a low level electrode for a relatively long time and the electrode in the inputless state or in consideration of a fact that a plurality of non-used electrodes may exist at rotationally symmetrical positions, it may be preferable to use two or more non-used electrodes not disposed at rotationally symmetrical positions for the connection direction identification. In other words, in a case that a plurality of non-used electrodes are used for the connection direction identification, a condition may be that the plurality of non-used electrodes do not exist in a combination of 90 degree rotation symmetry positions (e.g., A and P, etc.).

According to this modified embodiment, the receiving-side detection terminal 22 and the transmission-side detection terminal 32 may become unnecessary, and thus the connector unit 20 (i.e., the display device 2) and the interface unit 3 may be made at low cost or downsized. Further, since the detection signal generation may become unnecessary, the control circuit 35 (i.e., the interface unit 3) may be made at low cost or downsized.

In the above-described embodiments, the display device 2 may include: the connector unit 20 which includes the plurality of receiving electrodes 21 arranged to receive the input signal from the plurality of transmission electrodes 31 arranged to face the plurality of receiving electrodes 21 in the plurality of connection directions defined by in-plane rotation angles of the interface unit 3, in a predetermined region where the flat interface unit 3 including the plurality of transmission electrodes 31 is arranged to face the connector unit 20; the signal processor 25 which determines the arrangement of input data included in the input signal according to the connection direction; and the display output portion 26 to 29 which performs the image output processing according to the arrangement of the input data determined by the signal processor 25. Further, the interface unit 3 may include the substrate 3a, the cable 30 fixed to the substrate 3a, the plurality of transmission electrodes 31 disposed on the substrate 3a, and the control circuit 35 which supplies the input signal received from the cable 30 to the corresponding transmission electrode 31 of the plurality of transmission electrodes 31.

As such, the interface unit 3 may be connected to the connector unit 20 in the plurality of connection directions with respect to the rotation in the plane, and the input data contained in the input signal from the interface unit 3 may be arranged by the signal processor 25 according to the connection direction. Accordingly, the display device 2 which makes it possible to optimize the handling of the cable 30 or the cable C while maintaining the thin-profile characteristic may be realized. Further, the display system 1 using the display device 2 and the interface unit 3 suitable for such the display device 2 may be achieved.

It may be preferable that the plurality of receiving electrodes 21 are disposed in the 90 degree rotation symmetry. Similarly, it may be preferable that the plurality of transmission electrodes 31 are disposed in the 90 degree rotation symmetry or the non-used electrodes are removed from such the arrangement. Accordingly, it may be possible to handle the cable 30 or C in the up, down, left, and right directions with respect to the display device 2, and thus the ease of installation of the cable connection to the display device 2 may increase.

Further, the connector unit 20 may include the receiving-side detection terminal 22, and the interface unit 3 may include the transmission-side detection terminal 32. The control circuit 35 may be configured to transmit the detection signal to the transmission-side detection terminal 32, and the signal processor 25 may include the direction identifier 251 which identifies the connection direction based on the detection signal input from the transmission-side detection terminal 32 to the receiving-side detection terminal 22, and the arrangement determiner which determines the arrangement of the input data according to the connection direction. Accordingly, the configuration that reliably identifies the connection direction in a simple form may be realized.

Further, the interface unit 3 and the connector unit 20 may be configured such that the input signal or the like is transmitted in a non-contact manner from the plurality of transmission electrodes 31 to the plurality of receiving electrodes 21 by a electromagnetic field coupling. Accordingly, the opposing surfaces of the interface unit 3 and the connector unit 20 may not be exposed, and in addition to improving the moisture resistance and dustproofness, the dust resistance and the like against dust, mote, etc. which have a high tendency to stagnate near the display device may increase, and the reliability in the connection may be improved.

Further, the interface unit 3 and the connector unit 20 may be configured such that the input signal or the like is transmitted through a physical contact between the plurality of transmission electrodes 31 and the plurality of receiving electrodes 21. Accordingly, a reliable transmission of the input signal or the like may be possible. Further, in the control circuit 35 and the signal processor 25, processing for non-contact transmission (a signal format conversion of the input signal, an input signal amplification at the receiving side, pulse shaping, etc., if necessary) may be substantially unnecessary, and the interface unit 3 and the display device 2 may be made at low cost.

Further, the connector unit 20 may be provided at the back surface 2b of the display surface 2a. The back surface 2b of the display device 2 may be sufficiently large in area with respect to the connector unit 20, and thus a high degree of freedom in arrangement of the connector unit 20 may be obtained.

Second Embodiment

In the above first embodiment, the configuration in which the interface unit 3 is capable of being connected to the connector unit 20 in four directions every 90 degree rotation is described. In this embodiment, on the assumption of such the 90 degree rotational configuration, a configuration in which the interface unit 3 is mounted to the back surface 2b of the display device 2 by a fitting member or a engaging member may be described. In this embodiment, the same parts as the first embodiment may use the same reference numbers, and explanation thereof may be omitted or simplified.

(1) First Example

Figure 11:
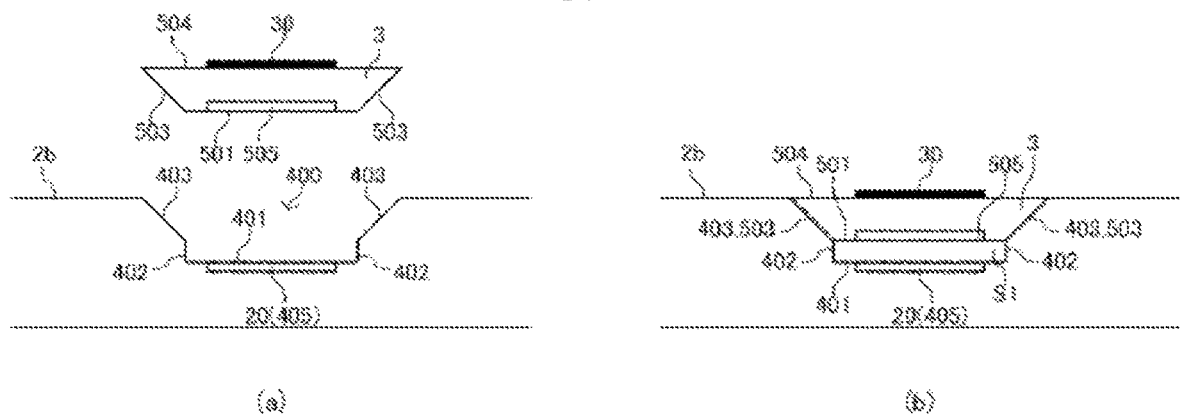
FIG. 11 is a cross-sectional view illustrating a display device and an interface unit according to a first example of a second embodiment of the present disclosure.

FIG. 11 is a cross-sectional view of the display device 2 and the interface unit 3 according to a first example of a second embodiment. FIG. 11(a) shows a state in which the interface unit 3 is not connected to the display device 2, and FIG. 11(b) shows a state in which the interface unit 3 is connected to the display device 2.

The back surface 2b of the display device 2 may include a recess 400 having a shape of a 90 degree rotation symmetry in a plane parallel to the back surface 2b. The recess 400 may be defined by a bottom surface 401, a side surface 402 and a tapered surface 403. The bottom surface 401 may be substantially parallel to the back surface 2b, and an input region 405 (e.g., the substrate 20a) on which the receiving electrode 21 and the receiving-side detection terminal 22 constituting the connector unit 20 are mounted may be provided on the bottom surface 401. The side surface 402 may be a surface that surrounds the bottom surface 401 and is substantially perpendicular to the bottom surface 401. The tapered surface 403 may be an inclined surface which continues from the side surface 402 and defines an opening that widens toward an outer side of the display device 2. The side surface 402 and tapered surface 403 may also have a shape that is 90 degree rotationally symmetric in a plane parallel to the back surface 2b.

The interface unit 3 (substrate 3a) may have a main surface 501 (a main surface 3aa), a tapered surface 503 and a back surface 504 (a back surface 3ab), and the main surface 501 and the tapered surface 503 may have a shape that is a shape of a 90 degree rotational symmetry in plane. In this example of this embodiment, the housing 3c of the interface unit 3 may not be installed. Alternatively, the main surface 501, the tapered surface 503, and the back surface 504 may constitute the housing 3c, and the substrate 3a may be disposed on the main surface 501. On the main surface 501, an output region 505 on which the transmission electrode 31 and the transmission-side detection terminal 32 are mounted may be provided. The tapered surface 503 may be an inclined surface corresponding to the tapered surface 403 of the recess 400. The cable 30 may be mounted and fixed on the back surface 504.

As shown in FIG. 11(b), in a case that the tapered surface 503 meets the tapered surface 403 when the interface unit 3 is connected, the back surface 2b of the display device 2 and the back surface 504 of the interface unit 3 may be configured to be coplanar. In a case of a non-contact coupling of the transmission electrode 31 (and the transmission-side detection terminal 32) to the receiving electrode 21 (and the receiving-side detection terminal 22), a height of the side surface 402 may be determined such that an appropriate space S1 (or clearance) between the output region 505 and the input region 405 is provided. In a case of a contact coupling of the transmission electrode 31 (and the transmission-side detection terminal 32) to the receiving electrode 21 (and the receiving-side detection terminal 22), the height of the side surface 402 may be determined such that the output region 505 and the input region 405 meet each other. Alternatively, the recess 400 may be formed such that the side surface 402 is not provided and the tapered surface 403 continues from the bottom surface 401.

Further, in a case that a non-contact coupling of the transmission electrode 31 (and the transmission-side detection terminal 32 to the receiving electrode 21 (and the receiving-side detection terminal 22), the input region 405 may be disposed inside the back surface 2b of the display device 2 at a position corresponding to the bottom surface 401. In this case, the output region 505 may be disposed in contact with the bottom surface 401, and the recess 400 may be formed such that the tapered surface 403 continues from the bottom surface 401 without the side surface 402 being provided.

As described above, the interface unit 3 may be entirely fitted to the recess 400 so that the position of the interface unit 3 may be determined with respect to the connector unit 20. For fixing the interface unit 3 to the recess 400, a configuration using a magnet may be used as in the first embodiment.

(2) Second Example

Figure 12:
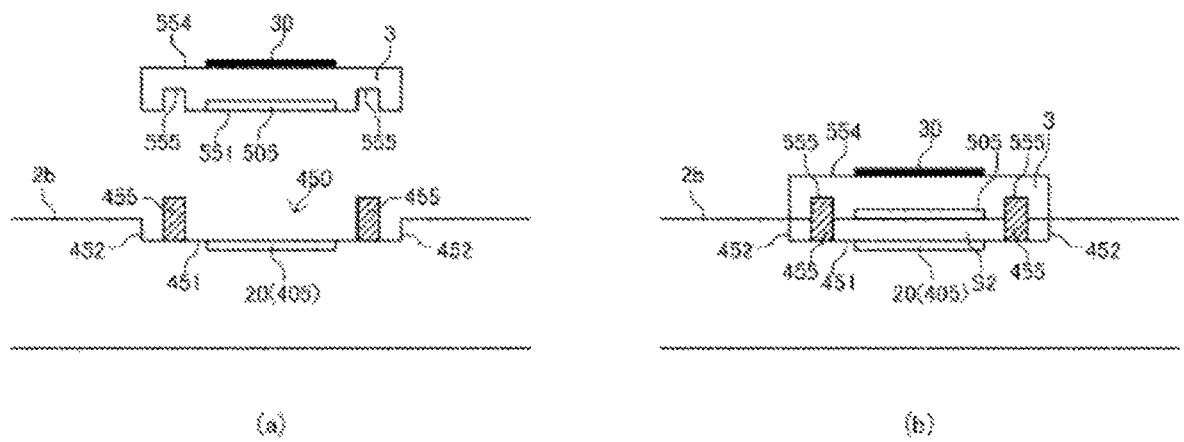
FIG. 12 is a cross-sectional view illustrating a display device and an interface unit according to a second example of a second embodiment of the present disclosure.

FIG. 12 is a cross-sectional view of the display device 2 and the interface unit 3 according to a second example of a second embodiment. FIG. 12(a) shows a state in which the interface unit 3 is not connected to the display device 2, and FIG. 12(b) shows a state in which the interface unit 3 is connected to the display device 2.

The back surface 2b of the display device 2 may include a recess 450. The recess 450 may be defined by a bottom surface 451 and a side surface 452. The bottom surface 451 may be substantially parallel to the back surface 2b, and an input region 405 on which the receiving electrode 21 and the receiving-side detection terminal 22 constituting the connector unit 20 are mounted may be provided on the bottom surface 451. The side surface 452 may be a surface that surrounds the bottom surface 451 and is substantially perpendicular to the bottom surface 451.

The protrusions 455 may be provided on the bottom surface 451 perpendicularly to the bottom surface 451 at positions (e.g., four corners of the rectangular bottom surface 451) that are 90 degree rotationally symmetrical in a plane parallel to the bottom surface 451. Further, the protrusion 455 may be a rod-shaped member (i.e., a pin), and may be a wall-shaped member extended in a front direction of a paper of FIG. 12. Further, the protrusion 455 may be formed integrally with the back surface 2b (the bottom surface 451), or be formed separately from the back surface 2b (the bottom surface 451).

The interface unit 3 may include a main surface 551 and a back surface 554. The output region 505 (the transmission electrode 31) and the transmission-side detection terminal 32 may be disposed at the center of the main surface 551. In a circumferential portion of the main surface 551, receiving portions 555 may be provided at positions corresponding to the protrusions 455. Thus, the receiving portions 555 may be provided at the positions (e.g., four corners of the rectangular main surface 551) which are 90 degree rotationally symmetrical in a plane parallel to the main surface 551. In a case that the protrusion 455 is a pin, the receiving portion 555 is a hole, and in a case that the protrusion 455 is a wall-shaped member, the receiving portion 555 is a groove. The cable 30 may be mounted and fixed on the back surface 554.

As shown in FIG. 12B, the protrusion 455 may be fitted to the receiving portion 555 when the interface unit 3 is connected. In a case of a non-contact coupling of the transmission electrode 31 (and the transmission-side detection terminal 32) to the receiving electrode 21 (and the receiving-side detection terminal 22), the protrusion 455 and the receiving portion 555 may be formed such that an appropriate space S2 (or a clearance) between the input region 405 and the output region 505 is provided. In a case of a contact coupling of the transmission electrode 31 (and the transmission-side detection terminal 32) to the receiving electrode 21 (and the receiving-side detection terminal 22), the protrusion 455 and the receiving portion 555 may be formed such that the output region 505 and the input region 405 are meet.

Further, in a case that a non-contact coupling of the transmission electrode 31 (and the transmission-side detection terminal 32 to the receiving electrode 21 (and the receiving-side detection terminal 22), the input region 405 may be disposed inside the back surface 2b of the display device 2 at a position corresponding to the bottom surface 451. In this case, the output region 505 may be disposed in contact with the bottom surface 451. Contrary to the aspect shown in FIG. 12, protrusions (pins or wall-shaped members) may be provided on the main surface 551 of the interface unit 3, and receiving portions (holes or grooves) corresponding to the protrusions may be provided on the back surface 2b (the bottom surface 451) of the display device 2. In this example of the second embodiment, the configuration in which the main surface 551 of the interface unit 3 and the back surface 2b of the display device 2 are coplanar with the interface unit 3 connected to the connector unit 20 is described, but the positional relationship in the depth direction of the main surface 551 and the back surface 2b is not limited to this. In other words, the main surface 551 may be located outside the display device 2 (upward in FIG. 12) than the back surface 2b, or may be located inside the display device 2 (downward in FIG. 12) than the back surface 2b.

The interface unit 3 may be positioned relative to the connector unit 20 by fitting the protrusion 455 to the receiving portion 555. For fixing the interface unit 3 to the recess 450, a configuration using a magnet may be used as in the first embodiment.

In this embodiment as above, the display device 2 may include the recess 400 to which the interface unit 3 is fitted, or the protrusion 455 or receiving portion (not shown) to which a part of the interface unit 3 is fitted. Further, similarly to the display device 2 of the first embodiment, the connector unit 20 may have a magnet or magnetic body (not shown) configured to determine a position of the interface unit 3. The interface unit 3 may have an overall shape fitted to the connector unit 20, or the receiving portion 555 or protrusion (not shown) fitted to a part of the connector unit 20. Similarly to the display device 2 of the first embodiment, the interface unit 3 may have a magnet or a magnetic body (not shown) configured to determine a position with respect to the connector unit 20.

Accordingly, the advantageous effects in the first embodiment may be achieved, and the positioning and fixing of the interface unit 3 with respect to the connector unit 20 may be promoted. Therefore, workability when connecting the cable 30 or C to the display device 2 may increase.

Modification

The preferred embodiments of this disclosure are described as above. However, this disclosure may be modified in various aspects, as described below.

(1) Modification Regarding a Connection Direction of the Interface Unit 3

In each of the above embodiments, the configuration in which the interface unit 3 is capable of being rotatably connected to the connector unit 20 in four directions every 90 degree is described. However, this disclosure may also be applicable to a configuration in which the connection direction is rotatable in three directions every 90 degrees, or a configuration in which the connection direction is rotatable in two directions every 180 degrees. In the configuration in which the connection direction is rotatable in two directions every 180 degrees, the receiving electrode 21 of the connector unit 20 and the transmission electrode 31 of the interface unit 3 may be disposed to be 180 degree rotationally symmetrical. In this case, an arrangement of the receiving-side detection terminal 22 of the connector unit 20 and the transmission-side detection terminal 32 of the interface unit 3 may be in such a manner that the 180 degree rotational connection is detectable.

(2) Modification Regarding a Connection Surface of the Interface Unit 3

In the first embodiment, the configuration in which the main surface 3aa of the interface unit 3 opposes the connector unit 20 is described. However, a configuration in which any of the main surface 3aa and the back surface 3ab of the interface unit 3 is able to coupled to the connector unit 20 is possible. In this case, the receiving-side detection terminal 22, the transmission-side detection terminal 32, and the signal processor 25 (the direction identifier 251) may identify not only the connection direction but also the connection surface (the main surface 3aa or back surface 3ab). In other words, the receiving electrode 21 and the receiving-side detection terminal 22 may be contactlessly coupled to the transmission electrode 31 and the transmission-side detection terminal 32 regardless of front and back. The direction identifier 251 may determine the connection surface and the connection direction based on the arrangement of the transmission-side detection terminal 32 with respect to the receiving-side detection terminal 22, and the arrangement determiner 252 may perform an arrangement determination processing of the input data based on the determination by the direction identifier 251. Accordingly, a user may connect the interface unit 3 to the display device 2 without checking the front and back of the interface unit 3, thereby improving the workability.

It will be apparent to those skilled in the art that various modifications and variations can be made in the present disclosure without departing from the sprit or scope of the disclosure. Thus, it is intended that the present disclosure covers the modifications and variations of this disclosure provided they come within the scope of the appended claims and their equivalents.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
a connector unit including a plurality of receiving electrodes configured to receive an input signal from a plurality of transmission electrodes of an interface unit having a flat plate shape;
a signal processor which determines an arrangement of an input data included in the input signal; and
a display output portion which performs an image output processing according to the arrangement of the input data determined by the signal processor,
wherein the plurality of receiving electrodes are disposed to face the plurality of transmission electrodes in each of a plurality of connection directions defined by in-plane rotation angles of the interface unit, in a predetermined region which the interface unit opposes, and
wherein the signal processor determines the arrangement of the input data according to the connection direction of the interface unit.

2. The display device of claim 1, wherein the plurality of receiving electrodes are arranged rotationally symmetrically.

3. The display device of claim 1, wherein the connector unit includes a detection terminal, and
wherein the signal processor includes a direction identifier which identifies the connection direction of the interface unit based on a detection signal input from the interface unit to the detection terminal, and an arrangement determiner which determines the arrangement of the input data according to the connection direction identified by the direction identifier.

4. The display device of claim 3, wherein the detection terminal is an electrode other than the plurality of receiving electrodes, and
wherein the detection signal is different from the input signal.

5. The display device of claim 3, wherein the detection terminal is a part of the plurality of receiving electrodes,
wherein the detection signal is a known specific signal included in the input signal, and
wherein the direction identifier is configured to identify the connection direction of the interface unit based on a position of the receiving electrode that receives the known specific signal.

6. The display device of claim 1, wherein the detection terminal is a part of the plurality of receiving electrodes, and
wherein the direction identifier is configured to identify the connection direction of the interface unit based on the position of an electrode to which no signal is input.

7. The display device of claim 1, wherein the input signal is configured to be transmitted in a non-contact manner from the plurality of transmission electrodes to the plurality of receiving electrodes by an electromagnetic field coupling.

8. The display device of claim 1, wherein the input signal is configured to be transmitted in a physical contact manner between the plurality of transmission electrodes and the plurality of receiving electrodes.

9. The display device of claim 1, wherein the display output portion includes a timing controller which controls a source driver and a gate driver, and
wherein the timing controller at least partially includes the signal processor.

10. The display device of claim 1, wherein the connector unit includes at least one of: a magnet or magnetic body configured to determine a position of the interface unit, a recess to which the interface unit is fitted, or a protrusion or receiving portion fitted to a part of the interface unit.

11. The display device of claim 1, wherein the connector unit is provided at a back of a display surface.

12. An interface unit, comprising:
a substrate;
an input signal cable fixed to the substrate;
a plurality of transmission electrodes disposed at the substrate; and
a control circuit which supplies an input signal received from the input signal cable to a corresponding transmission electrode among the plurality of transmission electrodes,
wherein the interface unit is connectable to a connector unit of a display device, the connector unit having a flat plate shape and including a plurality of receiving electrodes configured to receive an input signal from the plurality of transmission electrodes of the interface unit,
wherein the plurality of receiving electrodes are configured to face the plurality of transmission electrodes in each of a plurality of connection directions defined by in-plane rotation angles of the interface unit, in a predetermined region which the interface unit opposes, and
wherein a signal processor of the display device is configured to determine an arrangement of input data included in the input signal according to the connection direction of the interface unit.

13. The interface unit of claim 12, wherein the plurality of transmission electrodes are arranged in a rotationally symmetrical manner, or arranged with non-used electrodes removed from the rotationally symmetrical arrangement.

14. The interface unit of claim 12, further comprising a transmission-side detection terminal,
wherein the connector unit includes a receiving-side detection terminal,
wherein the control circuit is configured to transmit a detection signal to the transmission-side detection terminal, and
wherein the signal processor includes a direction identifier which identifies the connection direction of the interface unit based on the detection signal input from the transmission-side detection terminal to the receiving-side detection terminal, and an arrangement determiner which determines the arrangement of the input data according to the connection direction identified by the direction identifier.

15. The interface unit of claim 12, wherein the input signal is configured to be transmitted in a non-contact manner from the plurality of transmission electrodes to the plurality of receiving electrodes by an electromagnetic field coupling.

16. The interface unit of claim 12, wherein the input signal is configured to be transmitted in a physical contact manner between the plurality of transmission electrodes and the plurality of receiving electrodes.

17. The interface unit of claim 12, further comprising a magnet or magnetic body configured to be positioned with respect to the connector unit, or an overall shape fitted to the connector unit, or a receiving portion or protrusion fitted to a part of the connector unit.

18. A display system comprising:
an interface unit having a flat plate shape, the interface unit including:
   a substrate;
   an input signal cable fixed to the substrate;
   a plurality of transmission electrodes disposed at the substrate; and
   a control circuit which supplies an input signal received from the input signal cable to a corresponding transmission electrode among the plurality of transmission electrodes; and
a display device, including:
   a connector unit including a plurality of receiving electrodes configured to receive an input signal from the plurality of transmission electrodes of the interface unit;
   a signal processor which determines an arrangement of an input data included in the input signal; and
   a display output portion which performs an image output processing according to the input data of the arrangement determined by the signal processor,
wherein the plurality of receiving electrodes are disposed to face the plurality of transmission electrodes in each of a plurality of connection directions defined by in-plane rotation angles of the interface unit, in a predetermined region which the interface unit opposes, and
wherein the signal processor determines the arrangement of the input data according to the connection direction of the interface unit.

* * * * *